US011185390B2

(12) United States Patent
Scherer

(10) Patent No.: US 11,185,390 B2
(45) Date of Patent: Nov. 30, 2021

(54) SYSTEM AND DENTAL IMPLANT FOR REDUCING LOSSES OF DENTAL IMPLANTS OR DENTAL PROSTHESES

(71) Applicant: Johannes Scherer, Kissing (DE)

(72) Inventor: Johannes Scherer, Kissing (DE)

(*) Notice: Subject to any disclaimer, the term of this patent is extended or adjusted under 35 U.S.C. 154(b) by 0 days.

(21) Appl. No.: 15/541,759

(22) PCT Filed: Dec. 23, 2015

(86) PCT No.: PCT/EP2015/081201
§ 371 (c)(1),
(2) Date: Jul. 6, 2017

(87) PCT Pub. No.: WO2016/110419
PCT Pub. Date: Jul. 14, 2016

(65) Prior Publication Data
US 2018/0092711 A1 Apr. 5, 2018

(30) Foreign Application Priority Data

Jan. 7, 2015 (DE) .......................... 102015100117.9

(51) Int. Cl.
*A61C 8/00* (2006.01)
*A61C 1/08* (2006.01)

(52) U.S. Cl.
CPC ............ *A61C 1/084* (2013.01); *A61C 8/0037* (2013.01); *A61C 8/0045* (2013.01);
(Continued)

(58) Field of Classification Search
CPC ..... A61C 1/084; A61C 8/0045; A61C 8/0063; A61C 8/0089; A61C 8/0069;
(Continued)

(56) References Cited

U.S. PATENT DOCUMENTS 4,842,518 A * 6/1989 Linkow ................ A61C 8/0018
433/174
5,302,125 A * 4/1994 Kownacki ............ A61C 8/0048
433/172

(Continued)

FOREIGN PATENT DOCUMENTS

CH          702586 A2      7/2011
CN         102 240 228    11/2011
(Continued)

OTHER PUBLICATIONS

International Searching Authority-European Patent Office, English Translation of International Preliminary Report on Patentability, PCT/EP2015/081201, dated Jul. 11, 2017; 11 pages.

(Continued)

*Primary Examiner* — Nicholas D Lucchesi
*Assistant Examiner* — Mirayda A Aponte
(74) *Attorney, Agent, or Firm* — Sunstein LLP

(57) ABSTRACT

The present invention relates to a dental implant and a replacement ring. The dental implant has an insertion portion for anchoring in a jaw bone. The replacement ring serves for replacing a subtractively removable annular material region in a coronal region of the insertion portion. The shape of the replacement ring is inscribable into the shape of the dental implant in the coronal region at least to some extent such that an inner lateral surface of the replacement ring lies within the shape of the dental implant.

16 Claims, 6 Drawing Sheets

(52) U.S. Cl.
CPC .......... *A61C 8/0063* (2013.01); *A61C 8/0089* (2013.01); *A61C 8/0069* (2013.01); *A61C 8/0074* (2013.01)

(58) Field of Classification Search
CPC ......... A61C 8/0074; A61C 1/082; A61C 1/08; A61C 1/0018; A61C 1/0037; A61C 1/005; A61C 1/0048
USPC ...................... 433/173, 174, 182, 201.1, 196
See application file for complete search history.

(56) References Cited

U.S. PATENT DOCUMENTS

| | | | | |
|---|---|---|---|---|
| 5,417,570 A | * | 5/1995 | Zuest | ................... A61C 8/0048 433/172 |
| 5,564,926 A | | 10/1996 | Brånemark | |
| 5,727,942 A | | 3/1998 | Hartmann et al. | |
| 2005/0287497 A1 | * | 12/2005 | Carter | ................... A61C 8/005 433/173 |
| 2012/0156645 A1 | * | 6/2012 | Jacoby | ................. A61C 8/0062 433/173 |

FOREIGN PATENT DOCUMENTS

| | | | |
|---|---|---|---|
| CN | 102240228 A | * | 11/2011 |
| DE | 9420038 U1 | | 2/1995 |
| DE | 10 2005 032933 | | 1/2007 |
| EP | 2708205 A1 | | 3/2014 |
| JP | 2014 033782 | | 2/2014 |
| WO | WO 0224098 A2 | | 3/2002 |
| WO | WO 03/045268 | | 6/2003 |
| WO | WO 2015/145450 | | 10/2015 |
| WO | WO-2015145450 A1 | * | 10/2015 ........... A61C 8/0042 |

OTHER PUBLICATIONS

International Searching Authority—EPO, English translation of International Search Report, PCT/EP2015/051201; dated May 9, 2016. 3 pages.
European Patent Office, Examination Report, Application No. 15813890.9, dated Aug. 14, 2019, 7 pages.

* cited by examiner

SYSTEM AND DENTAL IMPLANT FOR REDUCING LOSSES OF DENTAL IMPLANTS OR DENTAL PROSTHESES

CROSS-REFERENCE TO RELATED APPLICATIONS

This Application is a U.S. national stage entry under 35 USC § 371 of PCT/EP2015/081201, filed Dec. 23, 2015, which claims priority to German Patent Application 102015100117.9, filed Jan. 7, 2015; both of which are incorporated herein by reference in their entireties.

FIELD OF THE INVENTION

The present invention lies in the field of dentistry and dental implant technology and relates to a system having a dental implant, and to a dental implant.

BACKGROUND OF THE INVENTION

In the treatment of patients with implants to provide a prosthesis or replacement tooth, it may be the case that already inserted implants have to be removed from the jaw bone of the patient. The main reasons for such losses are inflammation around the implant (so-called peri-implantitis) and fractures of the implant, the abutment or connecting screws.

A case of peri-implantitis is characterized by inflammation of the soft tissue, associated with a bone recession around the implant. This leads to the implant surface becoming exposed. Usually, the implant surface has a certain degree of roughness, which is produced using special treatment methods, for example with sand blasting or acid etching. This roughened implant surface is used to provide better bone apposition and bone integration (osseointegration). Exposure of the implant surface in the oral cavity of the patient increases the susceptibility to bacterial colonization of the implant surface. This can ultimately lead to the inserted implant needing to be removed again, since up to now there has been no known method for a restoring an implant surface to a germ-free or bacteria-free state once it has been infected with bacteria.

There are various causes for the development of a case of peri-implantitis: when attaching a prosthetic tooth to implants, a form of cement is often used between the prosthetic tooth and the abutment. A complete removal of surplus cement is often not possible. Remaining cement residues on the implant and/or replacement tooth can trigger an attack of peri-implantitis.

Bone recession can also be a cause of peri-implantitis, since the bone loss can give rise to exposure of the roughened implant surface. This can then be colonized by bacteria. The bacterial contamination can be the trigger for peri-implantitis.

Causes for bone recession on the implant surface are over stressing the bone during the operation or the implant insertion, and/or too thin a bone overlap, since below a certain level of bone strength the bone can react by receding. Other possible causes of bone decline and thus peri-implantitis are stresses in the implant, which can be transmitted to the bone and can lead to overloading of the bone while the implant is healing (healing phase) or during the insertion of the prosthetic tooth (prosthetic phase).

It is not only a bacterial colonization of the implant surface used for bone apposition, but also a bacterial colonization of the implant-abutment connection that can be a cause of peri-implantitis.

SUMMARY OF THE INVENTION

The object of the present invention is to provide a system and an implant, with which both the number of implant losses and the number of losses of the implant-supported prosthesis can be reduced.

This object is achieved by systems and dental implants according to the independent claims. Advantageous embodiments and further developments are specified in the dependent claims.

One of the two systems according to the invention comprises a dental implant with an insertion portion for anchoring in a jaw bone, and a replacement ring for replacing a subtractively removable annular material region in a coronal region of the insertion portion. The replacement ring has a shape that at least to some extent can be inscribed into the shape of the dental implant in the coronal region, in such a way that an inner peripheral surface of the replacement ring lies within the shape of the dental implant.

The shape of the replacement ring and of the tooth implant corresponds to the respective outer contour of the replacement ring or the dental implant, and is defined by the respective surfaces or boundary surfaces. Consequently, due to the shape of the replacement ring and the tooth implant, a respective volume is also defined that corresponds to the volume of the replacement ring or dental implant.

Due to the fact that in the case of a corresponding superposition in the coronal region, which involves an imaginary superposition of the abstract shapes but not an actual superposition of the physical objects, the shapes of the replacement ring and the tooth implant overlap such that the inner peripheral surface of the replacement ring lies inside the dental implant, it is possible to subtractively remove the material of the superposition region of the tooth implant and mount the replacement ring onto the coronal area of the tooth implant with a positive fit. This enables a contaminated implant surface which is infected with bacteria to be subtractively removed and replaced by the uncontaminated outer peripheral surface of the replacement ring, on which the bone can be deposited or adsorbed (so-called bone augmentation). The system according to the invention therefore enables the treatment of peri-implantitis caused by a bacterial contamination of the implant surface, and can also prevent peri-implantitis from occurring.

The material removal mentioned can be performed intra-orally on the inserted implant. Unlike in the prior art, in which inserted implants that may be infected with bacteria cannot, or not reliably, be decontaminated of bacteria, so that an implant removal may be required, the implant of the system according to the invention can be left in place, by replacing the subtractively removed infected surface with a "fresh" non-infected surface of the replacement ring in the jaw of the patient. This allows the probability, or the number, of implant losses and losses of the implant-borne prosthesis to be reduced.

The texture of the external surface of the replacement ring preferably corresponds to the texture of the dental implant surface to be replaced in the coronal region. Usually, dental implants in this region have a roughened surface texture or structure, to enable a better osseointegration. Special methods for surface treatment are used for this purpose, such as sand blasting or acid etching. By using an identical or similar surface texture of the replacement ring it is possible to establish a condition that corresponds to the original uncontaminated implant condition, without the need to remove the implant.

In an embodiment according to the invention, the shape of the replacement ring can be, at least to some extent, inscribed into the shape of the dental implant in the coronal region in such a way that the inner peripheral surface of the replacement ring lies within the shape of the dental implant and at the same time the outer peripheral surface of the replacement ring lies on or outside the outer peripheral surface of the tooth implant. If the above cited peripheral surfaces coincide, the shape of the dental implant is preserved after a portion of material corresponding to the replacement ring has been replaced by the replacement ring. It is also possible to enlarge the shape of the dental implant if required. This can be achieved by selecting the dimension of the replacement ring such that when it is being inscribed into the shape of the dental implant, the outer peripheral surface lies outside of the outer peripheral surface of the tooth implant.

In a preferred embodiment the inner peripheral surface of the replacement ring in some sections is inclined with respect to a central axis of the replacement ring and approaches the central axis in the direction of a coronal side of the replacement ring. The coronal side of the replacement ring is the side that is facing the prosthetic tooth when the replacement ring is mounted on the machined tooth implant. The opposite side of the replacement ring, which faces away from the prosthetic tooth and points in the direction of the tooth root, or previously existing tooth root, is in this description designated as the apical side of the replacement ring. Due to the above inclination, it is possible to fit the replacement ring on the appropriately subtractively machined dental implant in the apical direction and connect it thereto with a force fit. For example, the replacement ring can be fitted by means of an auxiliary part, such as a threaded rod, which is screwed to the implant. For example, the replacement ring can be pressed on using a tool with an internal thread, which is moved in the apical direction on the threaded rod by turning the tool. Alternatively the replacement ring can also be tapped onto the implant.

In a preferred embodiment the above cited inclination of the inner peripheral surface of the replacement ring towards the central axis is between 0.5° and 2.5°, preferably 1.50. An angle of 1.5° enables a particularly good force-fitting connection between the appropriately subtractively machined implant and the replacement ring, for which no additional screw connection is required.

In a preferred embodiment of the system according to the invention the outer peripheral surface of the dental implant in the coronal region at least in some sections is inclined towards an implant axis and approaches the implant axis in the direction of a coronal end of the insertion section. The implant axis, in the same way as the central axis of the replacement ring, is an imaginary straight line. The implant axis corresponds to a central longitudinal axis of the insertion portion, which is inserted into the jaw bone of the patient. The coronal end of the insertion portion is the end that points in the direction of the dental prosthesis. The opposite end of the insertion portion is designated as the apical end. The subtractive material removal from the implant is preferably not performed manually but by machine, for example by milling. The above inclination or tapering of the implant in the coronal direction allows a good milling capability, since the infected surface of the inserted implant is easily accessible in the coronal to apical direction.

The tapering of the coronal region of the dental implant also enables the apposition of a thicker layer of bone, since there is more space available around the implant. As described above, superimposing too thin a layer of bone can cause peri-implantitis. Therefore, due to the tapering, which enables the apposition of a thicker bone layer, a peri-implantitis infection can be prevented.

In an advantageous embodiment the slope of the peripheral surface of the dental implant in the coronal region in some sections is between 35° and 55°, preferably 45°. These angles facilitate a particularly good bone apposition and can therefore provide particularly good protection against peri-implantitis and reduce the risk of implant and prosthesis loss accordingly.

Alternatively or additionally, the slope of the peripheral surface of the dental implant in the coronal region is in some sections between 0° and 5°, preferably between 0° and 3°, in particular 1.5°. This means that in this region it is possible to uniformly subtractively remove an infected surface in the direction of the implant axis, or to remove a layer of material with constant thickness in this region. At the same time, the associated replacement ring with its correspondingly inclined inner peripheral surface can be mounted with a force fit and positive fit, without requiring a screw connection.

As well as the outer peripheral surface of the dental implant, the outer peripheral surface of the replacement ring can also, at least in some sections, be inclined towards the central axis of the replacement ring and approach the central axis in the direction of the coronal side of the replacement ring. This will preserve the advantage cited above of an improved bone apposition with a thicker layer of bone when using the replacement ring. In addition, a repeated subtractive removal or milling is easily possible, if this were to be necessary.

Corresponding to the inclination of the peripheral surface of the dental implant, the inclination of some sections of the outer peripheral surface of the replacement ring can also be between 35° and 55°, preferably 45°, which provides the same advantages as mentioned above.

In a further development according to the invention, the dental implant comprises a coronal projection, which extends from the insertion portion in the coronal direction and which is used for receiving an abutment and/or for receiving a machining unit for the intra-oral subtractive machining of the dental implant. In contrast to a recess or an inner cone, which is used for connecting the dental prosthesis, the coronal projection can increase the stability of the dental implant since in the region of the insertion portion, in particular in the coronal region of the insertion portion, the dental implant can be made solid. This enables stresses on the implant to be avoided, which can occur, for example, in the case of a screw connection to a non-solid dental implant, and which can increase the risk of peri-implantitis by transmission to the surrounding bone. The coronal projection can therefore reduce stresses, and the risk of a peri-implantitis infection and of fracturing of the implant can be reduced. Both of these lead to fewer dental implant and prosthesis losses.

The present invention further comprises a system which is similar to one of the aforementioned systems according to the invention, but which instead of the replacement ring comprises a replacement abutment. In addition to the replacement abutment, this system comprises a dental implant having an insertion portion for anchoring in a jaw bone, and a coronal projection, which extends from the insertion portion in the coronal direction and is used for receiving an abutment and/or for receiving a machining unit for the intra-oral subtractive machining of the dental implant. In case of contamination of the dental implant surface in the coronal region of the insertion portion, a material region of the dental implant can be subtractively removed, enabling the coronal projection to be extended in the apical direction. The replacement abutment, which cannot be mounted onto the unextended coronal projection of the dental implant with a positive fit in the originally inserted state, after dental implant material has been subtractively removed and thus the projection extended, can now be mounted on the extended coronal projection with a positive fit. This system can be used advantageously to correct aesthetic problems in mild forms of peri-implantitis, or in the case of recession of the soft tissue if no bone augmentation occurs and a part of the dental implant is exposed. Exposure of the dental implant, for example in the event of recession of the soft tissue and the resulting visibility of the metallic dental implant below the dental prosthesis, gives rise to aesthetic problems. By concealing this visible implant surface, which becomes exposed after a subtractive material removal, by means of the replacement abutment, these aesthetic problems can be corrected.

In one or both of the above mentioned systems according to the invention (either with replacement ring or replacement abutment), the coronal projection can run in the direction of a prosthesis axis, which is inclined with respect to the implant axis of the insertion portion, preferably at an angle α in the range $0°<α≤45°$. In treatment with dental implants there is a distinction between an implant axis and a prosthesis axis, which runs through the centre of the tooth crown. These two axes are often at an angle of 0° to 45° to each other. This inclination between the axes is normally compensated by angled abutments. Since a screwed-in tooth prosthesis is typically screwed in the direction of the prosthesis axis, in the case of an angled implant axis this will result in a double screwing operation:—a first screwing operation in the direction of the implant axis, in which the abutment is attached to the implant, and a second screwing operation in the direction of the prosthesis axis, in which the tooth replacement is attached to the abutment. Due to the above mentioned incline between the coronal projection and the insertion portion it is possible both to choose the angle α and to manufacture the implant such that, after the implant insertion the coronal projection points in the direction of the prosthesis axis of the dental prosthesis to be manufactured. This means that the first above mentioned screwing operation can be omitted and the dental prosthesis can be mounted on the implant using only one screwing operation. In contrast to the screw fitting of an angled abutment with an implant internal connection (i.e. non-solid implant with a recess and without coronal projection), in the case of the external implant connection (i.e. with a coronal projection) no bacteria or other sources of contamination can develop inside a first screw connection. By eliminating the first screw connection, a risk of contamination associated therewith, the risk of the incidence of peri-implantitis and consequently the risk of implant and prosthesis loss are reduced.

In all the above mentioned embodiments the coronal projection is preferably integrally connected to the insertion portion.

In addition, in all of the above-mentioned embodiments of the systems according to the invention, the coronal projection is preferably conical and preferably has a cone angle of less than 11°, particularly preferably a cone angle between 6° and 10° and in particular, a cone angle of 8°. A coronal projection shaped in this way allows a so-called self-locking tapered connection when mounting a correspondingly shaped abutment, which is stable, bacteria-proof and does not require cementing. By eliminating the use of cement and by preventing a bacterial colonization of the implant-abutment connection, the risk of implant and prosthesis losses can be reduced.

In an advantageous embodiment the coronal projection, at least in some sections, has a circular or elliptical cross-section. In contrast to a six-sided or polygonal-shaped cross section, such a cross-section allows an implant-abutment connection that is free of play, thus preventing loosening of screws and guaranteeing the bacteria-proof quality of the connection, which can contribute to a reduction in implant and prosthesis losses.

In an advantageous embodiment of the systems according to the invention, the tooth implant comprises a shoulder at the coronal end of the insertion portion. This means there is a space in the coronal region between the side peripheral surface of the implant, to which the bone abuts, and the implant connection for the dental prosthesis, such as the aforementioned coronal projection. Introducing this space (so-called platform switching) between the implant connection site and the surrounding tissue can prevent any bacterial colonization at the implant connection site from causing a peri-implantitis infection. The shoulder also makes it possible to ensure that enough space is available for material removal.

In the case of the above-mentioned systems according to the invention, the replacement ring or the replacement abutment can have an internal thread. This means that it is possible to screw the replacement ring or replacement abutment onto the dental implant by way of a corresponding external thread formed on the inserted dental implant. The external thread can be produced, for example, by cutting a thread in the coronal region. Before such a thread is cut, the dental implant can have been subtractively machined, for example by means of a milling process.

Finally, the system according to the invention can also comprise a device for intra-oral subtractive machining of the inserted dental implant, wherein the device comprises the following:
  a connection with which the device inside the oral cavity of a patient can be connected to the implant, and
  a subtractive machining unit, in particular a milling cutter, with which dental implant material can be removed from the surface of the coronal region.

The subtractive machining unit enables a manual grinding or polishing of the infected implant surface to be avoided, which is also difficult to do and not very reliable. For example, the device can include a milling cutter, which can be clamped in a dental contra-angle handpiece, for which purpose a guide part can be placed on top of the abutment. To match such a guide part, the milling cutter can comprise an inner recess. Preferably, the shape of the milling cutter can conform to the geometry of the subsequently mounted replacement ring, or conform to the geometry that is required for a positive-fitting attachment of the abutment. Due to the removal of the dental implant material, the exact shape can be created on which the replacement ring or the replacement abutment can be attached with a positive fit.

In addition to the previously mentioned systems according to the invention, the present invention also comprises a dental implant with an insertion portion extending along an implant axis, and a coronal projection for receiving an abutment and/or receiving a machining unit for the intra-oral subtractive machining of the insertion portion. The coronal projection extends from the insertion portion in the coronal direction along a prosthesis axis, wherein the prosthesis axis and the implant axis are inclined towards each other, preferably inclined towards each other at an angle α in the range 0°<α≤45°. As previously described, in the implant treatment an implant with the required angle for the individual case can be used, so that the dental prosthesis can be attached to the implant with only one screwing operation in the direction of the prosthesis axis. Because such an implant dispenses with the use of an angled abutment, which is screwed into the implant in the direction of the implant axis before the attachment of the dental prosthesis, it is possible to prefabricate the dental prosthesis on the abutment and to attach it to the implant at a later time with only one screwing operation. Because the attachment of the dental prosthesis to the abutment can be performed outside of the oral cavity of the patient and at a time which is independent of the treatment session with the patient, cement surpluses and/or other types of impurities can be avoided when inserting the dental prosthesis.

Moreover, due to the absence of a first connection, any impurities associated with this between the implant and an unnecessary angled abutment can be avoided.

Due to the coronal projection, by means of which an external implant-abutment connection can be produced, the implant can be made solid in the coronal region and thus stable, so that a tension-induced peri-implantitis infection and implant fractures can be prevented.

Accordingly this dental implant according to the invention also solves the problem of reducing the risk of losses of implants and prosthetics.

It is explicitly pointed out that the last named dental implant according to the invention can also comprise all the features and properties of those dental implants that have been described in connection with the aforementioned systems according to the invention.

The present invention also comprises a method comprising a subtractive machining of an inserted dental implant and an attachment of a replacement ring or a replacement abutment to the subtractively machined inserted dental implant.

In each of the parts of the replacement ring, the replacement abutment and the dental implant can be such parts as have been described in connection with the aforementioned systems according to the invention.

In a preferred embodiment of the method according to the invention, the subtractive machining comprises a milling operation.

The method according to the invention can also comprise forming a screw thread on the dental implant, for example by cutting a thread. The thread can be formed in the coronal region.

The attachment of the replacement ring or the replacement abutment to the inserted, subtractively machined dental implant can be performed using one or more of the following steps:
  tapping the replacement ring or the replacement abutment onto the dental implant,
  screwing using an internal thread of the replacement ring or replacement abutment and using an external thread of the dental implant,
  adhesive bonding, for example with cement or bone cement,
  intra-oral welding.

BRIEF DESCRIPTION OF THE DRAWINGS

Additional advantages and features of the invention are obtained from the description of the following figures, in which the same parts are labelled with the same reference number.

The drawings show.

DETAILED DESCRIPTION OF EXEMPLARY EMBODIMENTS

Figure 1:
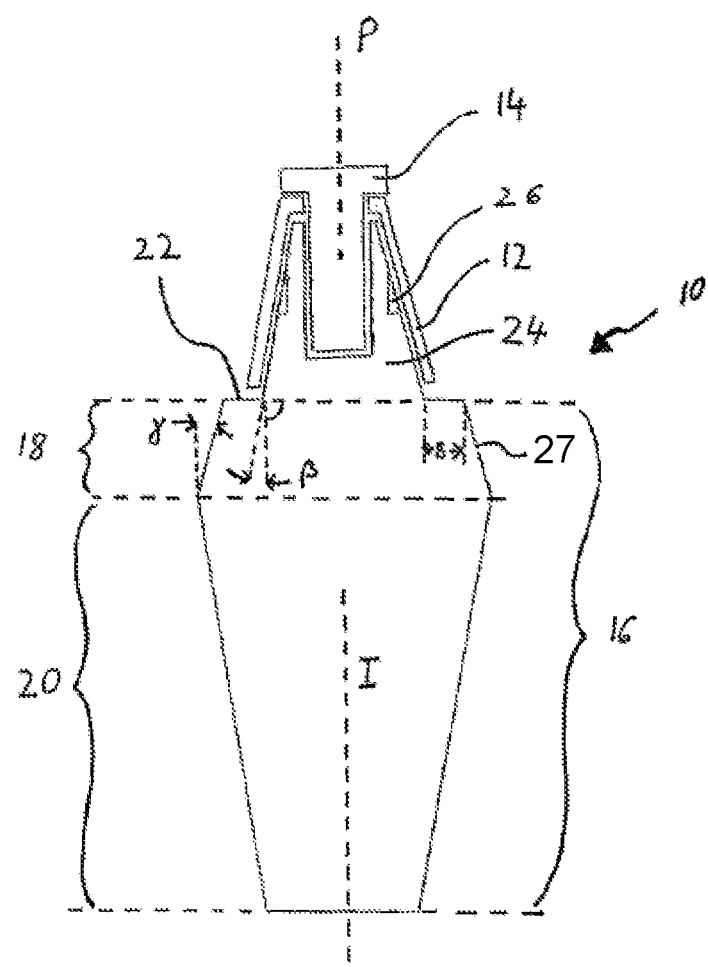
FIG. 1 a dental implant, which forms a part of a system according to the invention,
FIG. 2(a)—shows a longitudinal cross-section of the implant in FIG. 1.

FIG. 1 shows a dental implant 10 that is suitable for use in a system according to the invention and is attached to an abutment 12 using a screw 14. The dental implant 10 comprises an insertion portion 16, which in turn comprises a coronal region 18 and an apical region 20. At the coronal end of the insertion portion 16 a shoulder 22 is located, from which an external cone 24 extends in the coronal direction along a prosthesis axis P. In the implant 10 of FIG. 1 the prosthesis axis P coincides with an implant axis I, which runs along the insertion portion 16 through the centre thereof. Recesses 27 are provided on the side of the external cone 24, which are used to secure a rotational position of the abutment 12.

When providing a patient with the implant 10, the insertion portion 16 is inserted into the jaw bone of the patient, wherein the insertion portion 16 is screwed into the bone by means of a thread (not shown). As shown in FIG. 1, the apical region 20 can taper in the apical direction ("downwards" in FIG. 1). As can be seen from FIG. 1, in the coronal region 18 the outer peripheral surface 26 of the dental implant 10 is inclined with respect to the implant axis I by the angle γ, so that the coronal region 18 tapers in the coronal direction ("upwards" in FIG. 1). This tapering in the coronal direction allows the apposition of a thicker layer of bone onto the implant at the coronal end of the insertion portion 16, which enables the incidence of peri-implantitis to be avoided. By way of deviation from the not true-to-scale drawing of FIG. 1, the angle γ can have a value of 45°, which facilitates a particularly good bone augmentation. It is explained below that in some sections an angle of γ=1.5° can also be advantageous.

The cone angle β in a preferred embodiment is 8°. This means that the tapering connection between the correspondingly shaped abutment 12 and the external cone 24 is self-locking, i.e. on account of a frictional connection is secured against twisting, and to a certain extent against being pulled apart. Such a tapered connection with a cone angle β of less than 11° is self-locking and also bacteria-proof, so that the risk of bacteria accumulation between the abutment 12 and the implant 10 is low.

Preferably, the external cone 24 has a circular cross-section in a cut perpendicular to the prosthesis axis P. In contrast to a cross-section with a hexagonal profile or polygonal profile, the circular cross section avoids any play, for example when a rotational force acts on the abutment 12. This allows the anti-bacterial quality of the implant-abutment connection to be further improved and also prevents the screw 14 from becoming loose over time.

The shoulder 22 offers the advantage that, on the one hand enough space is available laterally, that is to say perpendicular to the implant axis I, to remove material from the implant 10 in the coronal region 18 and thus at the same time to remove a contaminated surface in the coronal region 18. On the other hand, due to the shoulder 22 a space exists between the apical end of the abutment 12 and the surrounding bone, which is adsorbed at the side of the peripheral surface of the implant 26. Due to this offset (so-called platform switching), the risk of peri-implantitis can be further reduced, because due to the shoulder 22 any bacterial colonization occurring in the implant-abutment connection does not directly adjoin the surrounding bone tissue and the treated implant surface for bone apposition.

In a preferred embodiment, the external cone 24 has a length of between 1.5 mm and 3.5 mm, for example 2.5 mm, the coronal region 18 has an extension of between 2 mm and 4 mm, for example, 3 mm, in the direction of the implant axis I and the external cone 24 has a diameter between 1.7 mm and 3.7 mm, for example, 2.7 mm, at the apical end at the level of the shoulder 22. The width B of the shoulder is 22 in a preferred embodiment is between 0.2 mm and 2 mm, for example, 1.5 mm.

In all embodiments according to the invention the implant 10 and/or the replacement ring 28 can be made of titanium.

Figure 2A:
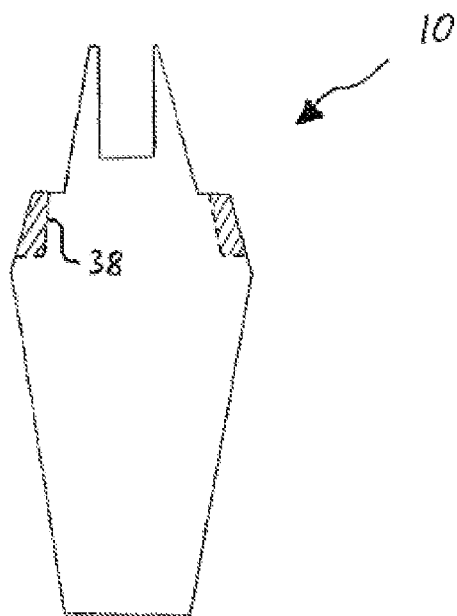
FIG. 2(b) shows a cross-sectional detail of the replacement ring in FIG. 2(a),
FIG. 3 a replacement ring which is used in the system according to the invention of FIG. 2, in a sectional view (top) and in plan view (bottom),
FIG. 4 a section through a replacement ring of a system according to the invention in accordance with a second embodiment,
FIG. 5 a section through a replacement ring of a system according to the invention in accordance with a third embodiment,
FIG. 6 an implant for an external implant-abutment connection (FIG. 6a) and an implant for an internal implant-abutment connection (FIG. 6b), and
FIG. 7 a dental implant according to the invention, in which the prosthesis axis and the implant axis are inclined towards each other.
Figure 2B:
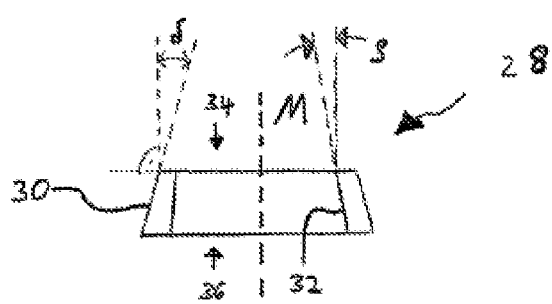

FIGS. 2(*a*)-2(*b*) shows a system according to the invention in accordance with a first embodiment with the implant 10 of FIG. 1 and a replacement ring 28. FIG. 2(*a*) shows a longitudinal section through the replacement ring 28 along a central axis M of the replacement ring. From FIG. 2(*b*) it can be seen that both the outer peripheral surface 30 of the replacement ring 28 and the inner peripheral surface 32 of the of the replacement ring 28 are inclined with respect to the central axis M, namely at an angle δ or ρ. This reduces both the outer and the inner diameter of the replacement ring 28 in the direction of a coronal side 34 of the replacement ring 28, which is located opposite to an apical side 36 of the replacement ring 28.

In the embodiment of FIG. 2 the region of material of the implant 10 to be replaced is shown hatched. It is important to note that, as in FIG. 1, the representation of the implant 10 in FIG. 2 is a longitudinal section through the implant along the implant axis I. The implant 10 can be rotationally symmetrical or substantially rotationally symmetrical about the implant axis I and the prosthesis axis P. A coronal region 18 which is rotationally symmetrical about the prosthesis axis P, offers the advantage that it can be easily milled using a milling cutter that rotates about the prosthesis axis P.

After the subtractive machining of the dental implant 10 the outer peripheral surface 30 of the dental implant 10 in the coronal region 18 preferably has a shape or contour that conforms to the inner peripheral surface 32 of the associated replacement ring 28. This makes it possible with the preferred inclination of the peripheral surfaces 30 and 32 with respect to the implant axis I, or to the central axis M, to mount the replacement ring 28 on to the subtractively machined implant 10 in the coronal to apical direction. With an angle of 1.5° between the peripheral surfaces 30, 32 and the respective axes I, M, the connection between the subtractively machined implant and the mounted replacement ring 28 can be force-fitting or friction-fitting, in such a way that an additional screw connection is not required.

The shape and the contour of the outer peripheral surface 30 of the replacement ring can conform to the shape and the contour of the peripheral surface 26 of the unmachined implant 10, but this is not absolutely required.

In order to restore the condition of the bacteria-free, unmachined implant 10 after the insertion, the replacement ring 28 preferably has an outer surface whose structure and texture correspond to that of the original implant surface.

Figure 3:
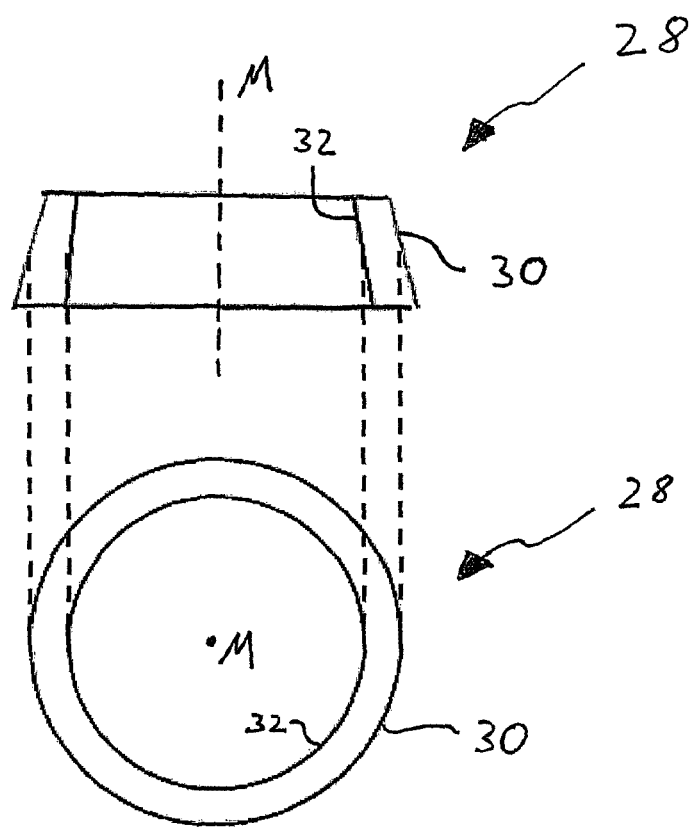

At the top of FIG. 3 the replacement ring 28 of the system of FIG. 2 is again represented as a longitudinal section along the central axis M. At the bottom of FIG. 3 and FIG. 4, a plan view of the replacement ring 28 is shown along the central axis M. Even if in the embodiment of FIG. 3 the cross-sections through the peripheral lines 32 and 30 of the replacement ring 28 are both circular, it is important to note that the cross-sectional lines through the peripheral surfaces 32 and 30 can also have other closed curves, for example that of a polygonal or hexagonal profile, or other non-symmetrical curves. The same is true for the implant, which does not necessarily have to be rotationally symmetrical.

Figure 4:
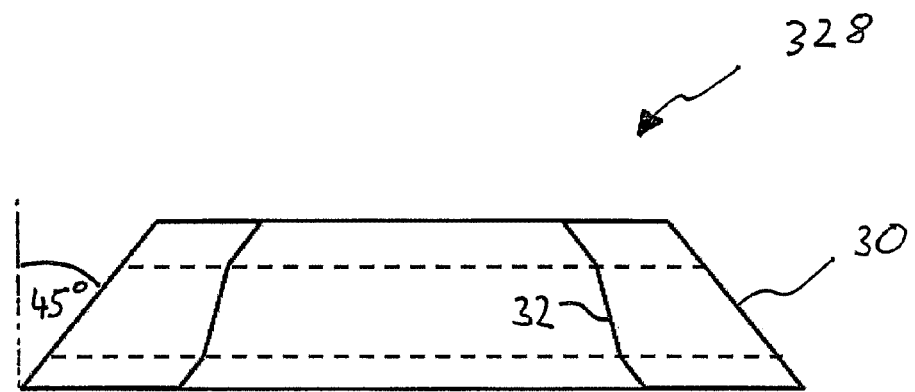
Figure 5:
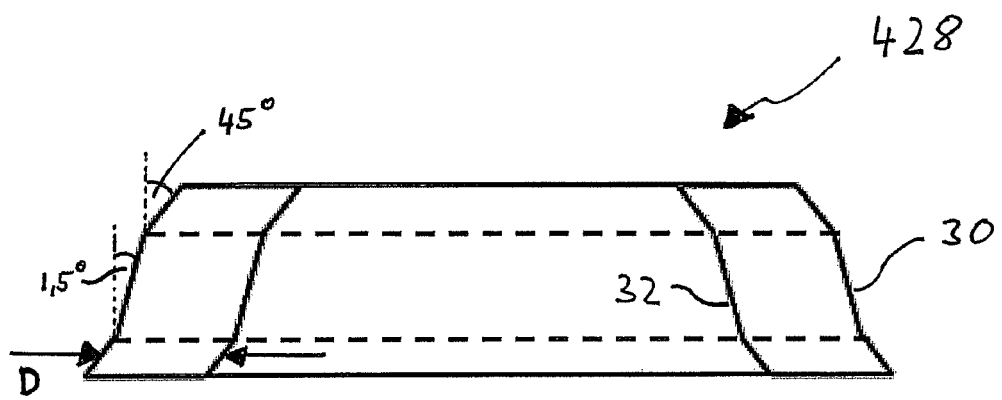

FIGS. 4 and 5 show replacement rings 328 and 428, which each belong to a system according to the invention of a second embodiment and a third embodiment. In the replacement ring 328 of FIG. 4 the outer peripheral surface 30 is inclined by 45° with respect to the central axis M, to enable good bone apposition and to prevent peri-implantitis. The inner peripheral surface of the 32, in a coronal and in an apical region (respectively above and below the dashed lines), is also inclined by 45° and thus parallel to the outer peripheral surface 30. In an intermediate region the inner peripheral surface 32 is inclined by 1.5° with respect to the central axis M to facilitate a force-fitting connection, which does not require a screw connection, between the correspondingly subtractively machined implant 10 and the replacement ring 328.

In the replacement ring 428 of FIG. 5 the profile of the inner peripheral surface 32 conforms to the profile of the inner peripheral surface 32 of the replacement ring 328 of FIG. 4. The profile of the outer peripheral surface 30 of the replacement ring 428 of FIG. 5 is parallel to the profile of the inner peripheral surface 32 of the same replacement ring. As a result, the thickness D of the replacement ring 428 is constant in the direction of the central axis M. If the profile of the peripheral surface 26 of the implant 10 corresponds to the profile of the peripheral surface 30 of the replacement ring 428, then the material removal can be effected uniformly along the implant axis I, i.e. the thickness of the material region removed is constant in the direction of the implant axis I.

Figure 6:
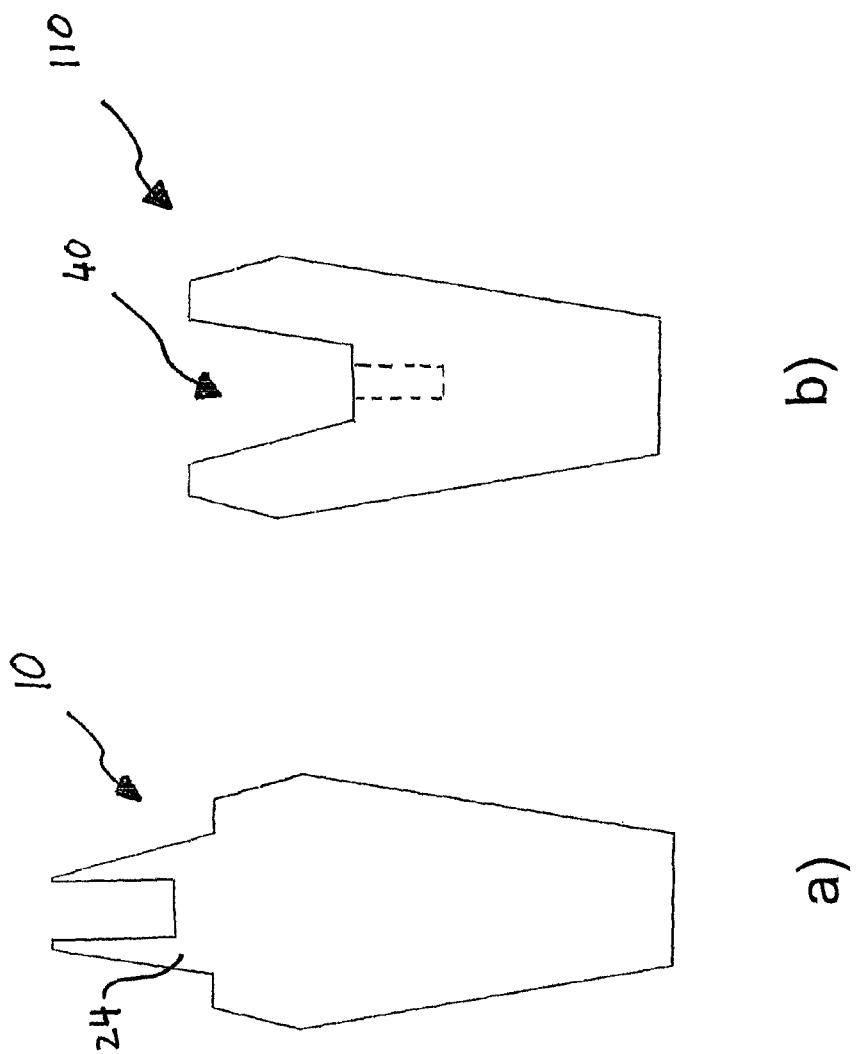

In FIG. 6 the implant 10 of FIGS. 1 and 2, which has an external cone 24, is compared with an implant 110, which has an internal cone 40 for an internal tapered connection.

Compared to an internal tapered connection, an external tapered connection with the cone 24 offers the advantage that the implant 10 can be made more solid and stable than the implant 110. Because of the solid design of the implant 10, tensions can be avoided during the fitting of a prosthesis tooth, in particular in the coronal region 18 of the insertion portion 16, which can reduce the stress on the surrounding tissue. The risk of an incidence of peri-implantitis and a resulting loss of the implant can therefore be reduced by means of the external cone 24. In addition, with the more solid implant 10 the risk of an implant fracture is also lower. There is also more material available for a subtractive removal, in which there is no risk that a critical wall thickness of the implant will be undershot.

Even if the implant 10 of FIG. 6a is preferred over the implant 110 of FIG. 6b for use within a system according to the invention, it should be noted that the implant 110 can also be part of a system according to the invention.

Figure 7:
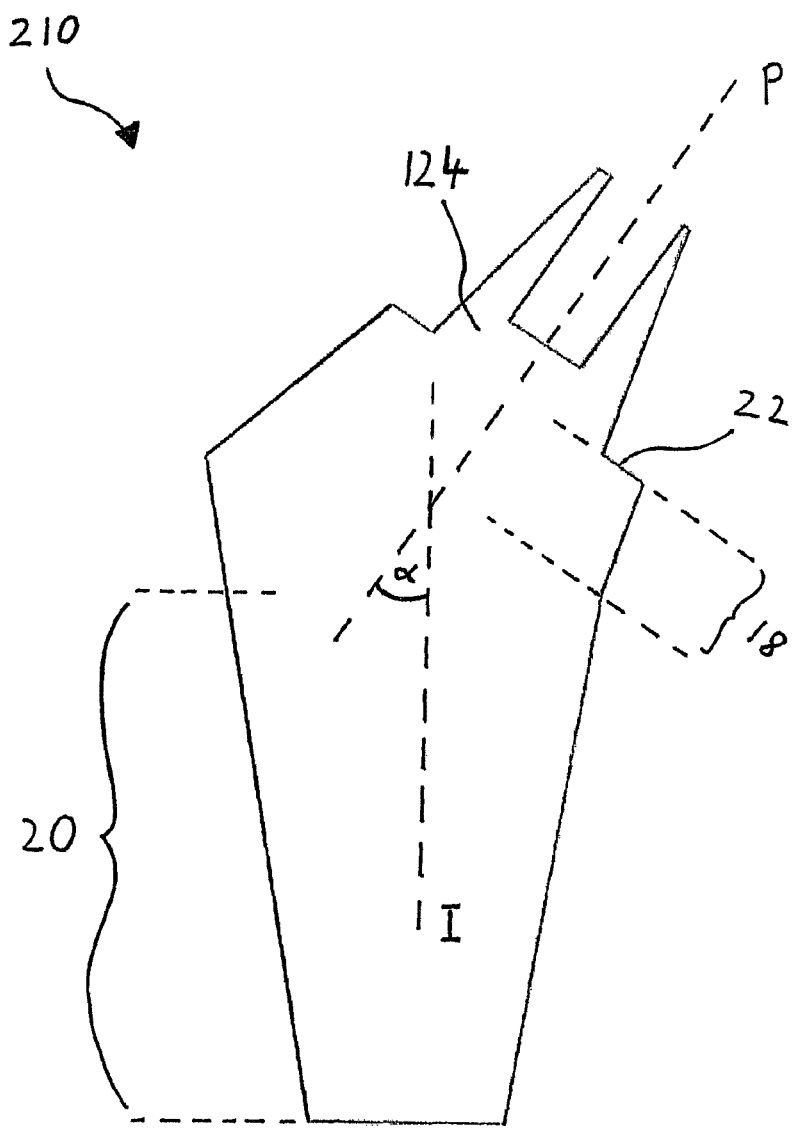

FIG. 7 shows a dental implant 210 according to the invention, having an external cone 124 which extends along a prosthesis axis P that is inclined at an angle α with respect to the implant axis I. The angle α has a value in the range 0°<α≤45°. When fitting a dental prosthesis it often happens that the prosthesis axis P, which extends through the centre of the dental prosthesis and along which the screw connection of the dental prosthesis is made, does not coincide with the implant axis I.

In the prior art therefore, angled abutments or adapter fittings are generally used, for example when fitting an implant 110, as shown in FIG. 6b. In a first step the abutment or the adapter piece is screwed together with the inserted implant in the direction of the implant axis I. In a second step the dental prosthesis is screwed along the prosthesis axis P which is inclined with respect to the implant axis I.

The implant 210 of FIG. 7 offers the advantage that only one screwing operation is required, namely along the prosthesis axis P, and the second connection between the implant and the abutment or the connection part can be dispensed with, even if the prosthesis axis P and the implant axis I are divergent. This makes it possible to form the dental prosthesis directly on the abutment and to cement it on the abutment even before the treatment session. This unit consisting of the dental prosthesis and abutment can then be mounted on the inserted implant 210 with only one screwing operation, without a cementing operation or other connection having to be carried out in the oral cavity of the patient, and thus reducing the risk of peri-implantitis and loss of the dental prosthesis and implant.

Since the dental implant 210 of FIG. 7 is solid in the same way as the dental implant 10, it has the same corresponding advantages as were described earlier in relation to FIG. 6a, thus further reducing the number of implant losses and the losses of implant-borne dental prostheses. The dental implant 210 can also be made from titanium, as is the dental implant 10.

It should be pointed out that the embodiments described above are purely examples of the present invention, which is not limited thereto. The previously described features can be meaningful in any combination. The scope of the present invention is derived solely from the claims.

LIST OF REFERENCE NUMERALS 10, 110, 210 dental implant
12 abutment
14 screw
16 insertion portion
18 coronal region
20 apical region
22 shoulder
24, 124 external cone
26 peripheral surface of the implant.
28, 328, 428 replacement ring
30 outer peripheral surface of the replacement ring
32 inner peripheral surface of the replacement ring
34 coronal side
36 apical side
38 peripheral surface of the implant after subtractive machining step
40 internal cone
P prosthesis axis
I implant axis
M central axis

The invention claimed is:
1. A system, comprising
a dental implant having an insertion portion for anchoring in a jaw bone, said insertion portion comprising a coronal region comprising a subtractively removable annular material region suitable for being intra-orally subtractively removed from the implant in its implanted state, permitting to remove an infected surface of said implant in said coronal region, and
a replacement ring for replacing said subtractively removable annular material region in said coronal region of the insertion portion after its subtractive removal, said implant being solid in said coronal region, the shape of the replacement ring being inscribable into the shape of the dental implant in the coronal region such that an inner surface of the replacement ring lies within the shape of the dental implant,
wherein:
said insertion portion which extends along an implant axis (I), and
said dental implant has a coronal projection for receiving an abutment, said coronal projection and said insertion portion being integrally connected and made from one piece,
wherein the coronal projection extends from the insertion portion in the coronal direction and along a prosthesis axis (P), and
characterized in that the prosthesis axis (P) and the implant axis (I) are inclined towards each other at an angle α in the range 0°<α≤45°.

2. The system according to claim 1, wherein the implant has a roughened surface texture in said coronal region for enabling a better osseointegration, and wherein the texture of the external surface of the replacement ring is the same as said texture of said dental implant surface in the coronal region.

3. The system according to claim 1, wherein the replacement ring has a shape adapted to be inscribed into the shape of the dental implant in the coronal region such that the inner surface of the replacement ring lies within the shape of the dental implant and that an outer peripheral surface of the replacement ring lies on or outside the peripheral surface of the dental implant.

4. The system according to claim 1, wherein, in some sections, the inner surface of the replacement ring is inclined towards a central axis (M) of the replacement ring and approaches the central axis in the direction of a coronal side of the replacement ring.

5. The system according to claim 4, wherein the inclination of some sections of the inner surface of the replacement ring towards the central axis is between 0.5° and 2.5°.

6. The system according to claim 1, wherein said coronal region of said implant is rotationally symmetrical about said prosthesis axis P, and wherein the peripheral surface of the dental implant in the coronal region is inclined towards said prosthesis axis (P) and approaches the prosthesis axis (P) in the direction of a coronal end of the insertion portion.

7. The system according to claim 6, wherein the inclination of the peripheral surface of the dental implant in the coronal region in some sections is between 35° and 55°.

8. The system according to claim 6, wherein the inclination of the peripheral surface of the dental implant in the coronal region in some sections is between 0° and 5°.

9. The system according to claim 1, wherein, in at least some sections, an outer peripheral surface of the replacement ring is inclined towards a central axis (M) of the replacement ring and approaches the central axis in the direction of a coronal side of the replacement ring.

10. The system according to claim 9, wherein the inclination of some sections of the outer peripheral surface (30) of the replacement ring is between 35° and 55°.

11. The system according to claim 1, wherein the coronal projection is conical and has a cone angle of less than 11°.

12. The system according to claim 1, wherein, in at least some sections, the coronal projection has a circular or elliptical cross section as viewed in a transversal direction from the length of the coronal projection.

13. The system according to claim 1, wherein the dental implant has a shoulder at the coronal end of the insertion portion.

14. The system according to claim 1, wherein the replacement ring or the replacement abutment comprises an internal thread for screwing the replacement ring or replacement abutment onto the dental implant using a corresponding external thread formed on the dental implant.

15. A system, comprising
a dental implant having an insertion portion for anchoring in a jaw bone, said insertion portion comprising a coronal region comprising a subtractively removable annular material region suitable for being intra-orally subtractively removed from the implant in its implanted state, permitting to remove an infected surface of said implant in said coronal region, and
a replacement ring for replacing said subtractively removable annular material region in said coronal region of the insertion portion after its subtractive removal, wherein said implant is solid in the coronal region, the shape of the replacement ring being, at least to some extent, inscribable into the shape of the dental implant in the coronal region, such that an inner surface of the replacement ring lies within the shape of the dental implant,
wherein the dental implant comprises a coronal projection, said coronal projection comprising an external cone, said external cone extending from the insertion portion in the coronal direction, for receiving an abutment,
wherein the coronal projection and the insertion portion are integrally connected and made from one piece, and wherein the dental implant has a shoulder at the coronal end of the insertion portion surrounding said external cone.

16. The system of claim 15, wherein the implant has a roughened surface texture in said coronal region for enabling a better osseointegration, and wherein the texture of the external surface of the replacement ring is the same as said texture of the dental implant surface in said coronal region.

* * * * *